(12) United States Patent
Sano et al.

(10) Patent No.: US 9,716,870 B2
(45) Date of Patent: Jul. 25, 2017

(54) IMAGE PROCESSOR, IMAGE PROCESSING METHOD, AND IMAGE PROJECTOR

(71) Applicant: KABUSHIKI KAISHA TOSHIBA, Tokyo (JP)

(72) Inventors: Yuma Sano, Kanagawa (JP); Wataru Watanabe, Kanagawa (JP); Masahiro Baba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 14/704,247

(22) Filed: May 5, 2015

(65) Prior Publication Data
US 2016/0014385 A1  Jan. 14, 2016

(30) Foreign Application Priority Data

Jul. 9, 2014  (JP) .................................. 2014-141753

(51) Int. Cl.
| | | |
|---|---|---|
| H04N 5/14 | (2006.01) | |
| H04N 9/31 | (2006.01) | |
| G03B 21/14 | (2006.01) | |

(52) U.S. Cl.
CPC ......... H04N 9/3194 (2013.01); H04N 9/3185 (2013.01); *G03B 21/147* (2013.01); *H04N 9/3188* (2013.01)

(58) Field of Classification Search
CPC ........................... H04N 5/7458; G06K 9/6201
USPC ........................................................ 348/571
See application file for complete search history.

(56) References Cited

U.S. PATENT DOCUMENTS

| | | | | |
|---|---|---|---|---|
| 2007/0122027 A1* | 5/2007 | Kunita | ................... | G06T 7/593 382/154 |
| 2013/0215298 A1* | 8/2013 | Kawabe | ................. | G06T 5/006 348/241 |
| 2015/0195479 A1 | 7/2015 | Sano et al. | | |

FOREIGN PATENT DOCUMENTS

| | | |
|---|---|---|
| JP | 2001-069433 | 3/2001 |
| JP | 2005-244835 | 9/2005 |
| JP | 2008-229175 | 10/2008 |
| JP | 2008-294961 | 12/2008 |
| JP | 2010-123007 | 6/2010 |
| JP | 2015-130555 | 7/2015 |

OTHER PUBLICATIONS

T. Takahashi et al., "A Study on Geometric Correction for Projected Images Based on 3D Measurement", IEICE Technical Report, vol. 107, No. 237, pp. 71-76, Oct. 2007.
(Continued)

*Primary Examiner* — Paulos M Natnael
*Assistant Examiner* — Omer Khalid
(74) *Attorney, Agent, or Firm* — Nixon & Vanderhye, P.C.

(57) ABSTRACT

According to one embodiment, an image processor includes a setter and a corrector. The setter sets correction information to cause an entirety of an object image to be viewable when an image projected onto a projection surface is viewed from a viewpoint. The object image is projected from a projection position. The setting is performed based on information relating to a configuration of the projection surface where the object image is projected, information relating to the projection position, and information relating to a position of the viewpoint. The corrector corrects the object image based on the correction information.

18 Claims, 15 Drawing Sheets

(56) References Cited

OTHER PUBLICATIONS

Sano et al., U.S. Appl. No. 14/565,869, filed Dec. 10, 2014.
English-language machine translation of JP2001-069433.
English-language machine translation of JP2005-244835.
English-language machine translation of JP2008-229175.
English-language machine translation of JP2008-294961.
English-language machine translation of JP2010-123007.

* cited by examiner

IMAGE PROCESSOR, IMAGE PROCESSING METHOD, AND IMAGE PROJECTOR

CROSS-REFERENCE TO RELATED APPLICATIONS

This application is based upon and claims the benefit of priority from Japanese Patent Application No. 2014-141753, filed on Jul. 9, 2014; the entire contents of which are incorporated herein by reference.

FIELD

Embodiments described herein relate generally to an image processor, an image processing method, and an image projector.

BACKGROUND

When an image projector such as, for example, a projector or the like projects an image, and a projection surface where the image is projected includes a non-planar surface, the image that is projected onto the projection surface may be distorted when the projection surface is viewed from a position that is different from that of the image projector. Conversely, by correcting the input image based on information relating to the unevenness of the projection surface, the distortion of the image projected onto the projection surface is suppressed even when the projection surface is viewed from the position that is different from that of the image projector.

However, when such a correction is added, there are cases where the size of the corrected image is inappropriate for the projection surface. An image processor, an image processing method, and an image projector are desirable to project an image of the appropriate size while suppressing the distortion of the configuration of the image projected onto the projection surface without performing, for example, a complex operation such as imaging the projection surface from the viewpoint position even in the case where the non-planar projection surface is viewed from the position that is different from that of the image projector.

DETAILED DESCRIPTION

Figure 1:
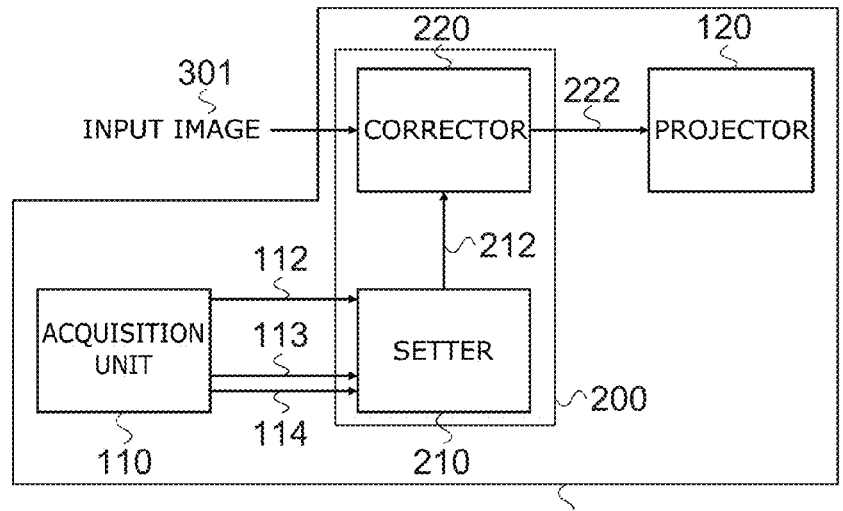
FIG. 1 is a block diagram showing an image projector according to an embodiment of the invention.

According to one embodiment, an image processor includes a setter and a corrector. The setter sets correction information to cause an entirety of an object image to be viewable when an image projected onto a projection surface is viewed from a viewpoint. The object image is projected from a projection position. The setting is performed based on information relating to a configuration of the projection surface where the object image is projected, information relating to the projection position, and information relating to a position of the viewpoint. The corrector corrects the object image based on the correction information.

Various embodiments will be described hereinafter with reference to the accompanying drawings. Similar components in the drawings are marked with like reference numerals, and a detailed description is omitted as appropriate.

FIG. 1 is a block diagram showing an image projector according to an embodiment of the invention.

The block diagram shown in FIG. 1 is an example of relevant components of an image processor according to the embodiment and does not necessarily match the configuration of an actual program module.

The image projector 100 shown in FIG. 1 includes the image processor 200, an acquisition unit 110, and a projector 120.

The image processor 200 includes a setter 210 and a corrector 220.

The image processor 200 may be an external device different from the image projector 100 or may be a device included in the image projector 100. The hardware configuration shown in FIG. 1 is an example; and a portion of the image processor 200 or the entire image processor 200 according to the embodiments and the specific examples may be realized as an integrated circuit such as LSI (Large Scale Integration), etc., or an IC (Integrated Circuit) chipset. Each functional block may be provided with a processing feature individually; or some or all of the functional blocks may be provided with processing features by being integrated. The integrated circuit is not limited to LSI and may be realized using a dedicated circuit or a general-purpose processor.

The acquisition unit 110 acquires information (configuration information) 112 relating to a three-dimensional configuration of a surface (a projection surface) 351 where an image is projected (referring to FIG. 5C), information (projection position information) 113 relating to the position of the image projector 100 from which the image is projected, and information (viewpoint information) 114 relating to the position of a viewpoint from which the projection surface 351 is viewed. The acquisition unit 110 transmits the configuration information 112, the projection position information 113, and the viewpoint information 114 to the setter 210.

The setter 210 sets information relating to the size of the corrected image and information relating to the position of the corrected image (correction information) 212 based on the configuration information 112, the projection position information 113, and the viewpoint information 114. A corrected image 222 is an image of an input image (an object image) 301 corrected by the corrector 220. The setter 210 transmits the correction information 212 to the corrector 220.

The corrector 220 corrects the input image 301 based on the correction information 212 and transmits the corrected image 222 to the projector 120. The projector 120 projects the corrected image 222.

Figure 2:
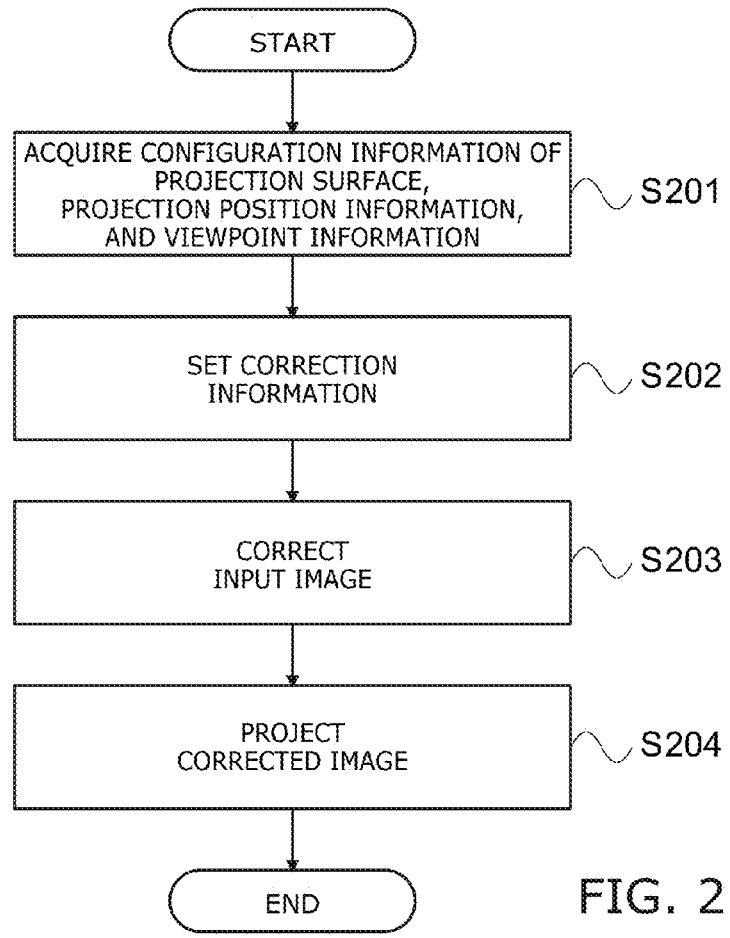
FIG. 2 is a flowchart describing an image processing method according to the embodiment.

FIG. 2 is a flowchart describing an image processing method according to the embodiment.

The acquisition unit 110 acquires the configuration information 112 of the projection surface 351, the projection position information 113, and the viewpoint information 114 and transmits this information to the setter 210 (step S201).

The acquisition unit 110 of the embodiment will now be described with reference to the drawings.

Figure 3:
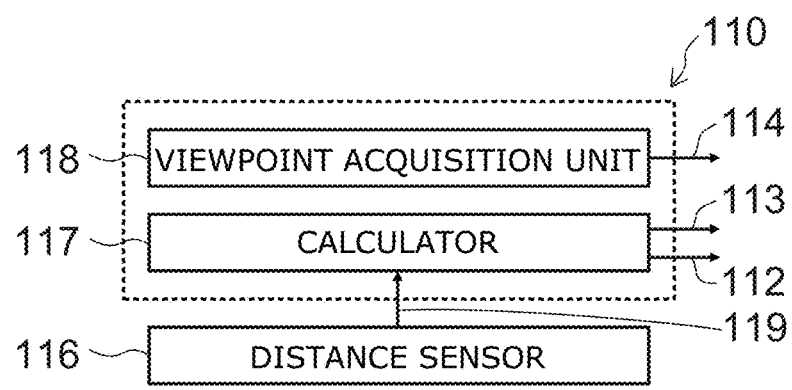
FIG. 3 is a block diagram illustrating the acquisition unit of the embodiment.

FIG. 3 is a block diagram illustrating the acquisition unit of the embodiment.

Figure 4:
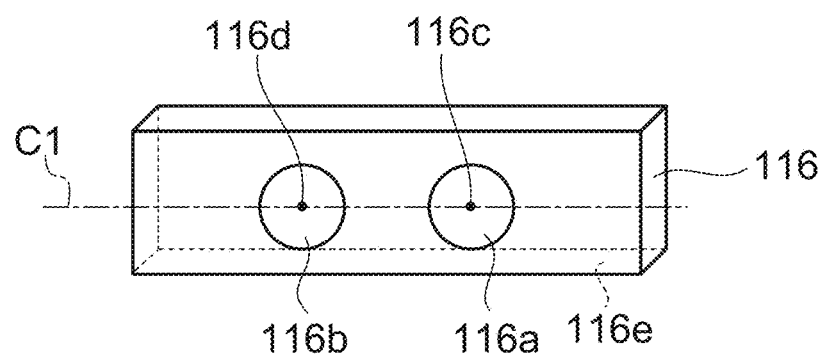
FIG. 4 is a perspective view illustrating a distance sensor of the embodiment.

FIG. 4 is a perspective view illustrating a distance sensor of the embodiment.

Figure 5A:
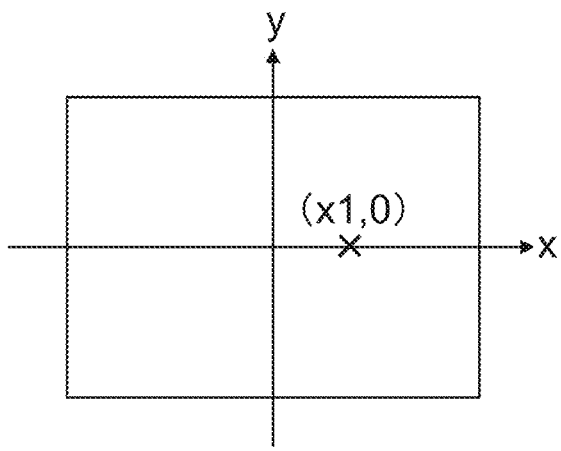
FIG. 5A to FIG. 5C are schematic plan views describing the method for calculating the three-dimensional coordinates of the projection surface.
Figure 5B:
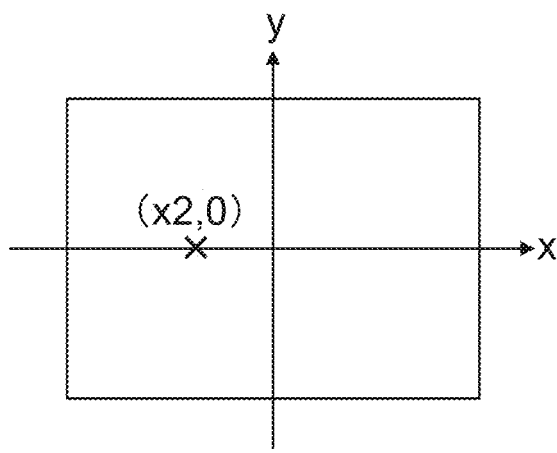
Figure 5C:
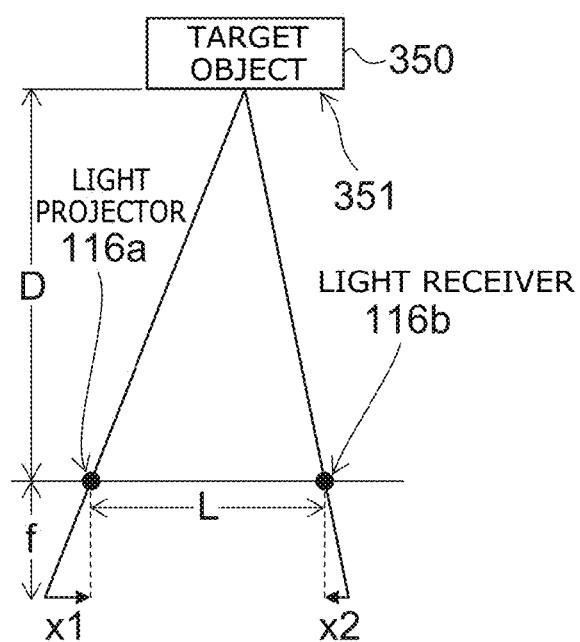

FIG. 5A to FIG. 5C are schematic plan views describing the method for calculating the three-dimensional coordinates of the projection surface.

FIG. 5A is a schematic plan view illustrating the coordinates of a pixel of the light projection image. FIG. 5B is a schematic plan view illustrating the coordinates of a pixel of the light reception image. FIG. 5C is a schematic plan view illustrating the geometrical optical relationship between the light projector, the light receiver, and the target object. A target object 350 forms the projection surface 351.

As shown in FIG. 3, the acquisition unit 110 includes a distance sensor 116, a calculator 117, and a viewpoint acquisition unit 118. The distance sensor 116 measures the distance between the projection surface 351 and the distance sensor 116 itself and transmits information (distance information) 119 relating to the distance to the calculator 117. Based on the distance information 119, the calculator 117 acquires the configuration information 112 of the projection surface 351 and the projection position information 113 and transmits this information to the setter 210.

As shown in FIG. 4, the distance sensor 116 of the embodiment includes a light projector 116a and a light receiver 116b. The light projector 116a and the light receiver 116b are provided at substantially the same height. A center line C1 that connects a center 116c of the light projector 116a and a center 116d of the light receiver 116b is substantially parallel to a bottom surface 116e of the distance sensor 116. Therefore, the center line C1 is horizontal when the distance sensor 116 is installed on a horizontal surface.

The light projector 116a projects infrared light having a random pattern onto the projection surface 351. The light receiver 116b receives the infrared light that is projected from the light projector 116a and reflected from the projection surface 351. Here, the patterns of the infrared light projected by the distance sensor 116 and the infrared light received by the distance sensor 116 are considered to be two-dimensional images; and coordinates $(x_c, y_c)$ of the pixels of the light reception image correspond to coordinates $(x_p, y_p)$ of the pixels of the light projection image. The calculator 117 can determine coordinates $(X_s, Y_s, Z_s)$ of the three-dimensional configuration of the projection surface 351 when the light receiver 116b is used as the origin by determining the coordinates $(x_c, y_c)$ of the pixels of the light reception image corresponding to the coordinates $(x_p, y_p)$ of the pixels of the light projection image.

The method for calculating the coordinates $(X_s, Y_s, Z_s)$ of the three-dimensional configuration of the projection surface 351 will now be described further with reference to FIG. 5A to FIG. 5C.

As shown in FIG. 5A, the case is considered where coordinates (x2, 0) of a pixel of the light reception image correspond to coordinates (x1, 0) of a pixel of the light projection image. The relationship between the light projector 116a, the light receiver 116b, and the target object 350 where the light of the pixel having the coordinates (x1, 0) of the light projection image is incident is as shown in FIG. 5C.

A distance L shown in FIG. 5C is the physical distance between the light projector 116a and the light receiver 116b. A distance "D" shown in FIG. 5C is the distance between the distance sensor 116 and the target object 350. The focal length "f" shown in FIG. 5C is the focal length of the light receiver 116b. In such a case, the relationship of Formula (1) holds due to the geometrical relationship.

$$\frac{D}{L} = \frac{f}{(x1 - x2)} \qquad \text{Formula (1)}$$

From Formula (1), the distance D between the distance sensor 116 and the target object 350 is expressed by Formula (2).

$$D = \frac{fL}{(x1 - x2)} \qquad \text{Formula (2)}$$

Thereby, the three-dimensional coordinates $(X_s, Y_s, Z_s)$ of the point of the target object 350 where the light of the pixel of the coordinates (x1, 0) of the light projection image is incident is expressed by Formula (3) to Formula (5).

$$X_s = \frac{x_c}{f}D = \frac{x2}{f}D \qquad \text{Formula (3)}$$

$$Y_s = \frac{y_c}{f}D = 0 \qquad \text{Formula (4)}$$

$$Z_s = D = \frac{fL}{(x1 - x2)} \qquad \text{Formula (5)}$$

In the embodiment, the distance sensor 116 is described in which the light projector 116a projecting the infrared light having the designated pattern is a single body with the light receiver 116b receiving the infrared light. The light that is projected by the light projector 116a and received by the light receiver 116b may be visible light. Also, as another example of a method for measuring the distance, the image projector 100 may include a not-shown imager instead of the distance sensor 116. In such a case, the projector 120 projects light having a designated pattern onto the target object 350. The imager images the target object 350. The image projector 100 determines the distance between the imager and the target object 350 from the correspondence between the image that is imaged by the imager and the original pattern that the projector 120 projects onto the target object 350.

Instead of the distance sensor 116, the image projector 100 may include not-shown multiple imagers. In such a case, the image projector 100 determines the distance between the imager and the target object 350 from the correspondence between the pixels of the multiple images that are imaged by the multiple imagers. For example, the image projector 100 determines the distance between the target object 350 and a straight line connecting two imagers.

The method for measuring the distance by the distance sensor 116 is not limited to methods in which light having a designated pattern is projected. For example, the distance sensor 116 may measure the distance between the projection surface 351 and the distance sensor 116 itself by projecting light modulated in a pulse configuration onto the projection surface 351, receiving the light reflected by the projection surface 351, and by using the difference between the phase of the projected light and the phase of the received light.

Thus, the distance sensor 116 is an example of a method for acquiring the three-dimensional configuration of the target object 350 where the image from the projector 120 is projected. The method for acquiring the three-dimensional configuration of the target object 350 is not limited thereto.

The coordinates of the three-dimensional configuration of the target object 350 are calculated using the light receiver 116b of the distance sensor 116 as the origin. Therefore, the coordinates of the projection position (the projector 120) can be set based on the distance between the light receiver 116b of the distance sensor 116 and the projector 120. For example, in the case where the projector 120 and the light receiver 116b are separated from each other by px in the x-direction, py in the y-direction, and pz in the z-direction, the coordinates of the projection position can be set to be $(X_p, Y_p, Z_p)=(px, py, pz)$. The calculator 117 calculates the three-dimensional configuration of the projection surface 351 and transmits the configuration information 112 of the projection surface 351 and the projection position information 113 to the setter 210.

The viewpoint acquisition unit 118 acquires the viewpoint information 114 and transmits the viewpoint information 114 to the setter 210. In the embodiment, the viewpoint acquisition unit 118 includes a lookup table (LUT) in which predetermined positions of the viewpoints are recorded; and the viewpoint acquisition unit 118 acquires the viewpoint information 114 by reading the LUT. The coordinates of the viewpoints when the light receiver 116b of the distance sensor 116 is used as the origin are pre-recorded. The viewpoint acquisition unit 118 acquires coordinates $(X_c, Y_c, Z_c)$ recorded in the LUT as the viewpoint information 114.

Figure 6A:
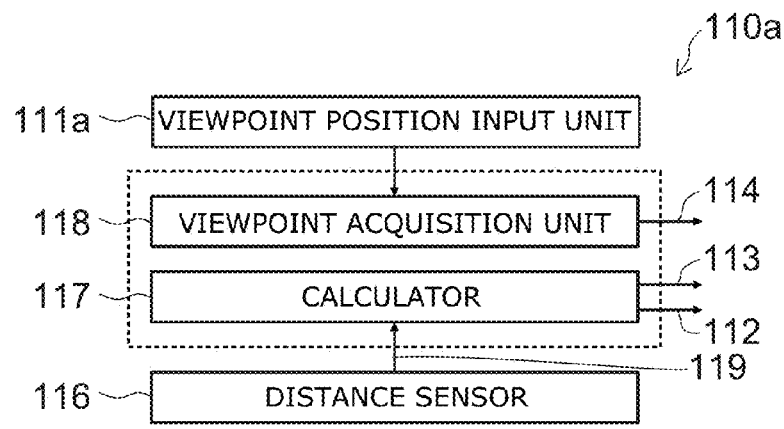
FIG. 6A to FIG. 6C are block diagrams illustrating other acquisition units of the embodiment.
Figure 6B:
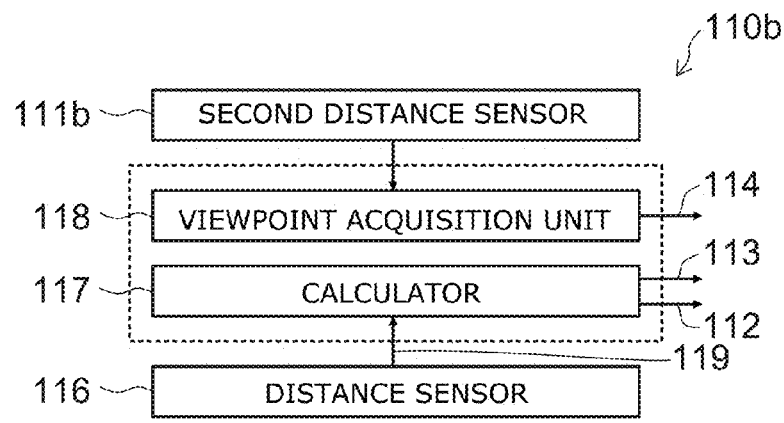
Figure 6C:
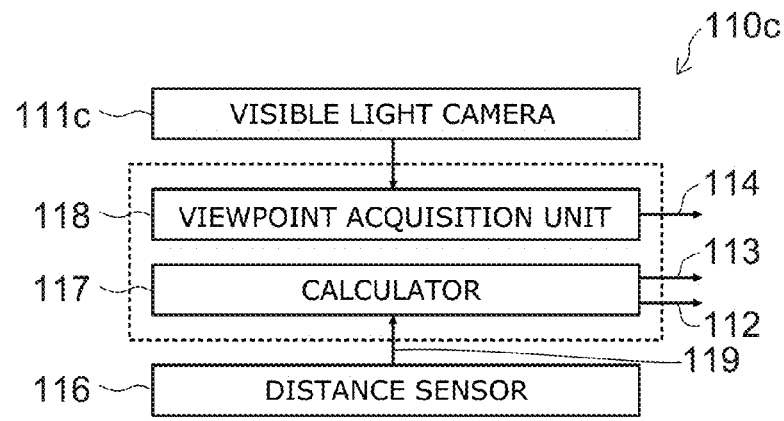

FIG. 6A to FIG. 6C are block diagrams illustrating other acquisition units of the embodiment.

As shown in FIG. 6A, as another mode for acquiring the viewpoint information 114, an acquisition unit 110a may include a viewpoint position input unit 111a to which a user can input the viewpoint position. In such a case, the user inputs information relating to the position of the viewpoint using the viewpoint position input unit 111a. Thereby, the viewpoint acquisition unit 118 can acquire the viewpoint information 114.

As another mode for acquiring the viewpoint information 114, as shown in FIG. 6B, an acquisition unit 110b may include a second distance sensor 111b. The second distance sensor 111b can acquire information relating to the position of a viewer. Thereby, the viewpoint acquisition unit 118 can acquire the viewpoint information 114.

As another mode for acquiring the viewpoint information 114, as shown in FIG. 6C, an acquisition unit 110c may include a visible light camera 111c. The visible light camera 111c can acquire the information relating to the position of the viewer. Thereby, the viewpoint acquisition unit 118 can acquire the viewpoint information 114.

Figure 7:
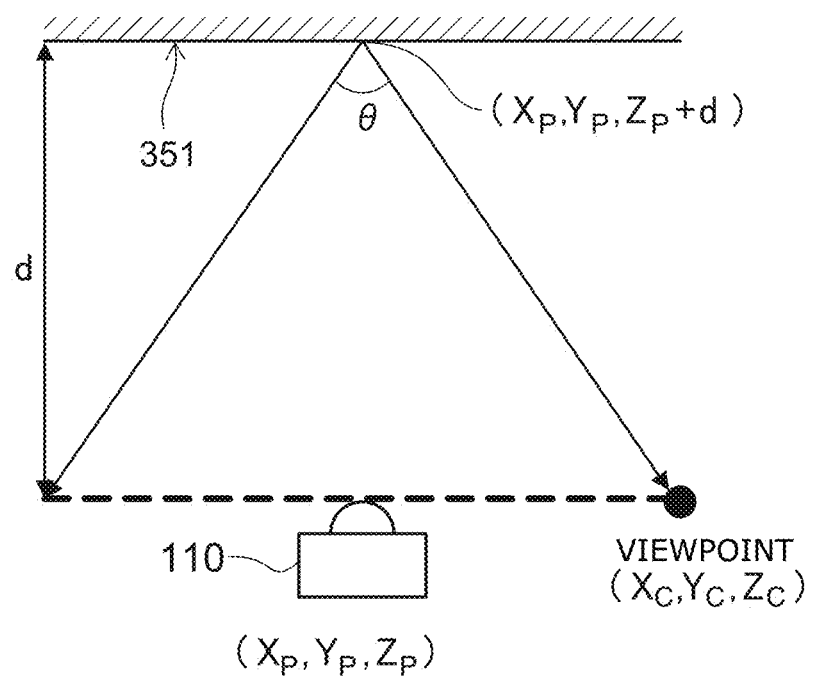
FIG. 7 is a plan view illustrating another mode for acquiring the viewpoint information.

FIG. 7 is a plan view illustrating another mode for acquiring the viewpoint information.

As the mode for acquiring the viewpoint information 114, the viewpoint acquisition unit 118 may acquire the viewpoint information 114 based on the distance between the projection surface 351 and the projector 120 calculated by the calculator 117. Specifically, as shown in FIG. 7, a viewing angle θ is preset. The coordinates $(X_c, Y_c, Z_c)$ of the position of the viewpoint can be set according to the viewing angle θ and the value of a distance d between the projector 120 and the projection surface 351. The coordinates $(X_c, Y_c, Z_c)$ of the position of the viewpoint are expressed by Formula (6) to Formula (8). The three-dimensional coordinates of the projector 120 are expressed by $(X_P, Y_P, Z_P)$. The viewing angle in the horizontal direction is expressed by $θ_X$. The viewing angle in the vertical direction is expressed by $θ_Y$.

$$X_C = X_P \pm \frac{d}{\tan\frac{θ_X}{2}} \qquad \text{Formula (6)}$$

$$Y_C = Y_P \pm \frac{d}{\tan\frac{θ_Y}{2}} \qquad \text{Formula (7)}$$

$$Z_C = Z_P \qquad \text{Formula (8)}$$

The acquisition unit 110 transmits the configuration information 112 of the projection surface 351, the projection position information 113, and the viewpoint information 114 to the setter 210.

Returning now to FIG. 2, the setter 210 sets the correction information 212 based on the coordinates $(X_s, Y_s, Z_s)$ of the three-dimensional configuration of the projection surface 351, the coordinates $(X_p, Y_p, Z_p)$ of the projection position, and the coordinates $(X_c, Y_c, Z_c)$ of the viewpoint position and transmits the correction information 212 to the corrector 220 (step S202). The correction information 212 includes information relating to the position of the projected image (the corrected image 222) and information relating to the size of the projected image (the corrected image 222) such that the image information of the entire input image 301 is viewable when the image projected onto the projection surface 351 is viewed from the coordinates $(X_c, Y_c, Z_c)$ of the viewpoint position.

The operation of the setter 210 will now be described further with reference to FIG. 8 and FIGS. 9A to 9C.

Figure 8:
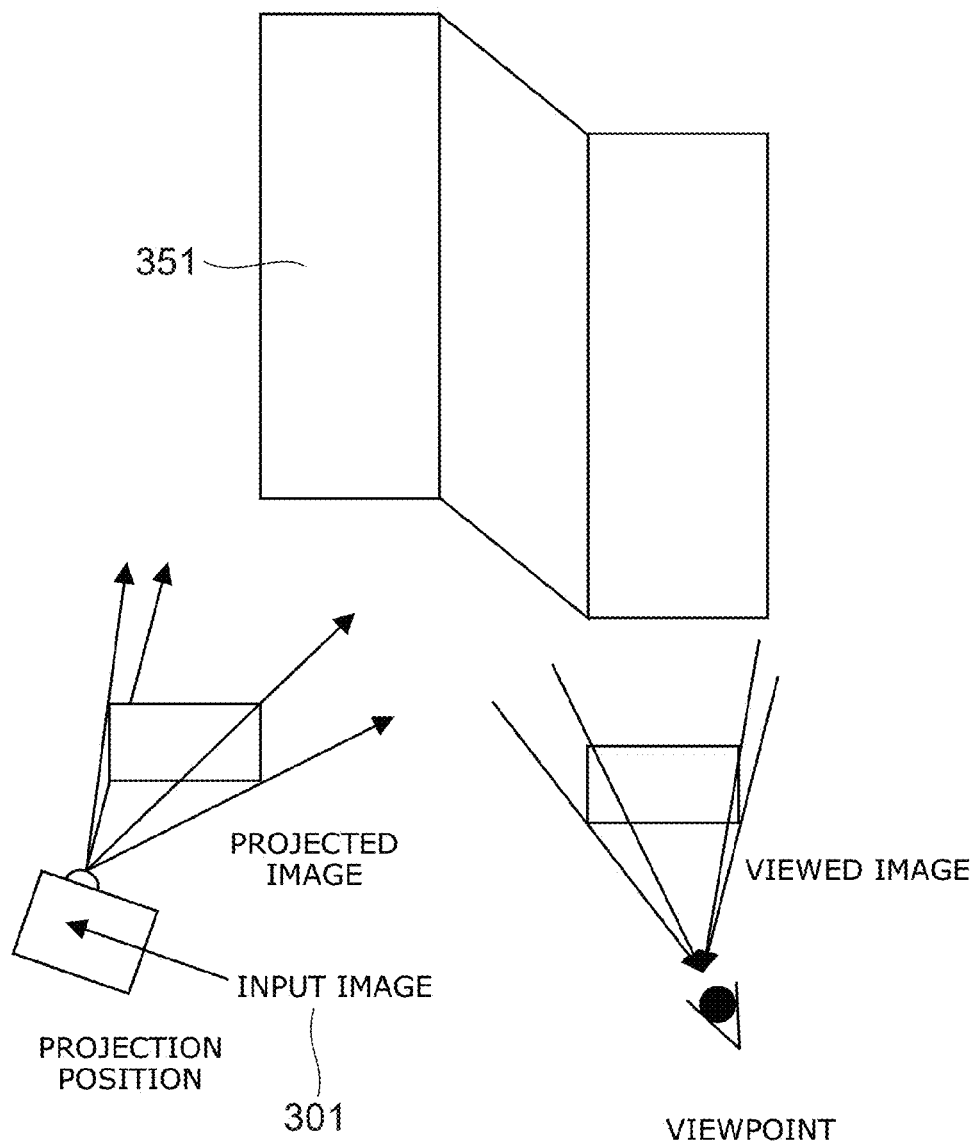
FIG. 8 is a perspective view illustrating the positional relationship between the projection surface, the projection position, and the viewpoint.

FIG. 8 is a perspective view illustrating the positional relationship between the projection surface, the projection position, and the viewpoint.

Figure 9A:
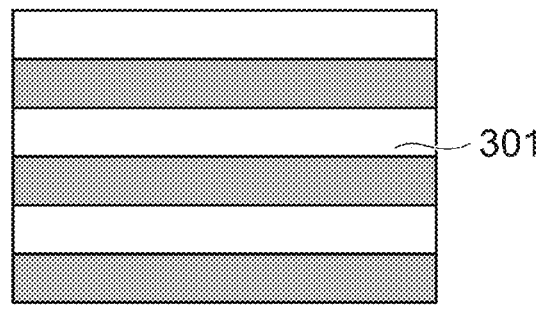
FIG. 9A to FIG. 9C are plan views showing the input image and the viewed image.
Figure 9B:
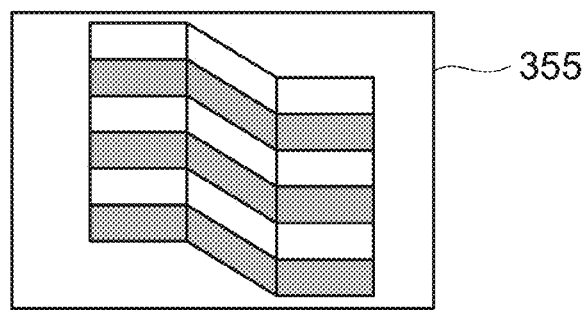
Figure 9C:
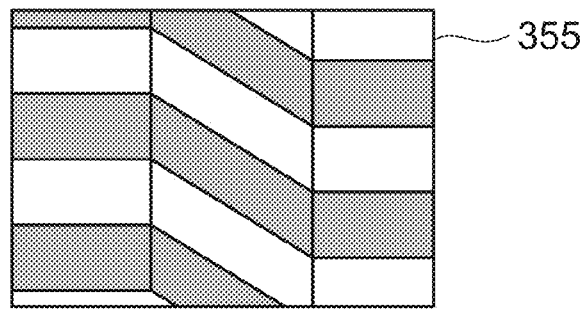

FIG. 9A to FIG. 9C are plan views showing the input image and the viewed image.

FIG. 9A is a schematic plan view showing the input image 301. FIG. 9B is a schematic plan view showing an example of a viewed image in which the projected image projected onto the projection surface by the input image 301 shown in FIG. 9A is viewed from the viewpoint. FIG. 9C is a schematic plan view showing another example of the viewed image in which the projected image projected onto the projection surface by the input image 301 shown in FIG. 9A is viewed from the viewpoint.

For convenience of description in the description of the operation of the setter 210, an image formed by imaging the projection surface from the position of the viewpoint by an imaging device such as a camera, etc., is called the viewed image. However, the imaging of the projection surface from the position of the viewpoint by the imaging device such as the camera, etc., is for convenience of description of the operation of the setter 210 or is imaginary. In the embodiment, an imaging device such as a camera or the like is unnecessary at the position of the viewpoint. For example, the appearance of the viewed image may be estimated by setting parameters of the eye of a human.

FIG. 9B shows the example of the viewed image viewed from the position of the viewpoint in the case where the projector 120 projects an image having a relatively small size. FIG. 9C shows the example of the viewed image viewed from the position of the viewpoint in the case where the projector 120 projects an image having a relatively large size. The viewed image shown in FIG. 9B includes the information of the entire input image 301. On the other hand, the viewed image shown in FIG. 9C does not include the information of a portion of the input image 301. In other words, because the size of the image projected by the projector 120 is relatively large, the image that is projected toward the projection surface has a portion that is outside the area of a screen 355 of the viewed image at the viewpoint. In other words, a region of the input image 301 exists that cannot be viewed. The information relating to the input image 301 includes information to be displayed. Therefore, it is desirable for all of the information relating to the input image 301 to be included within the area of the screen 355 of the viewed image viewed at the viewpoint position.

The area of the screen 355 is equivalent to the imageable area of the imaging device such as the camera, etc., described above. In other words, the area of the screen 355 is equivalent to the area of the limits of the field of view at the position of the viewpoint.

Here, it is possible to cause the information relating to the input image 301 to be within the area of the screen 355 of the viewed image by viewing, from the viewpoint, the projected image projected onto the projection surface 351 from the projector 120 and by adjusting the size of the projected image, etc., according to the appearance of the viewed image. However, it is a burden for the user to adjust the projection conditions while repeating the projection and the viewing.

Conversely, the image processor 200 according to the embodiment estimates the viewed image at the viewpoint by performing an operation to calculate the positions of the viewed image that correspond to the pixels of the input image 301 and corrects the input image 301 to cause the information relating to the input image 301 to be within the area of the screen 355 of the viewed image (step S203). The image projector 100 according to the embodiment projects the corrected image 222 corrected by the input image 301 onto the projection surface from the projector 120 (step S204).

Figure 10:
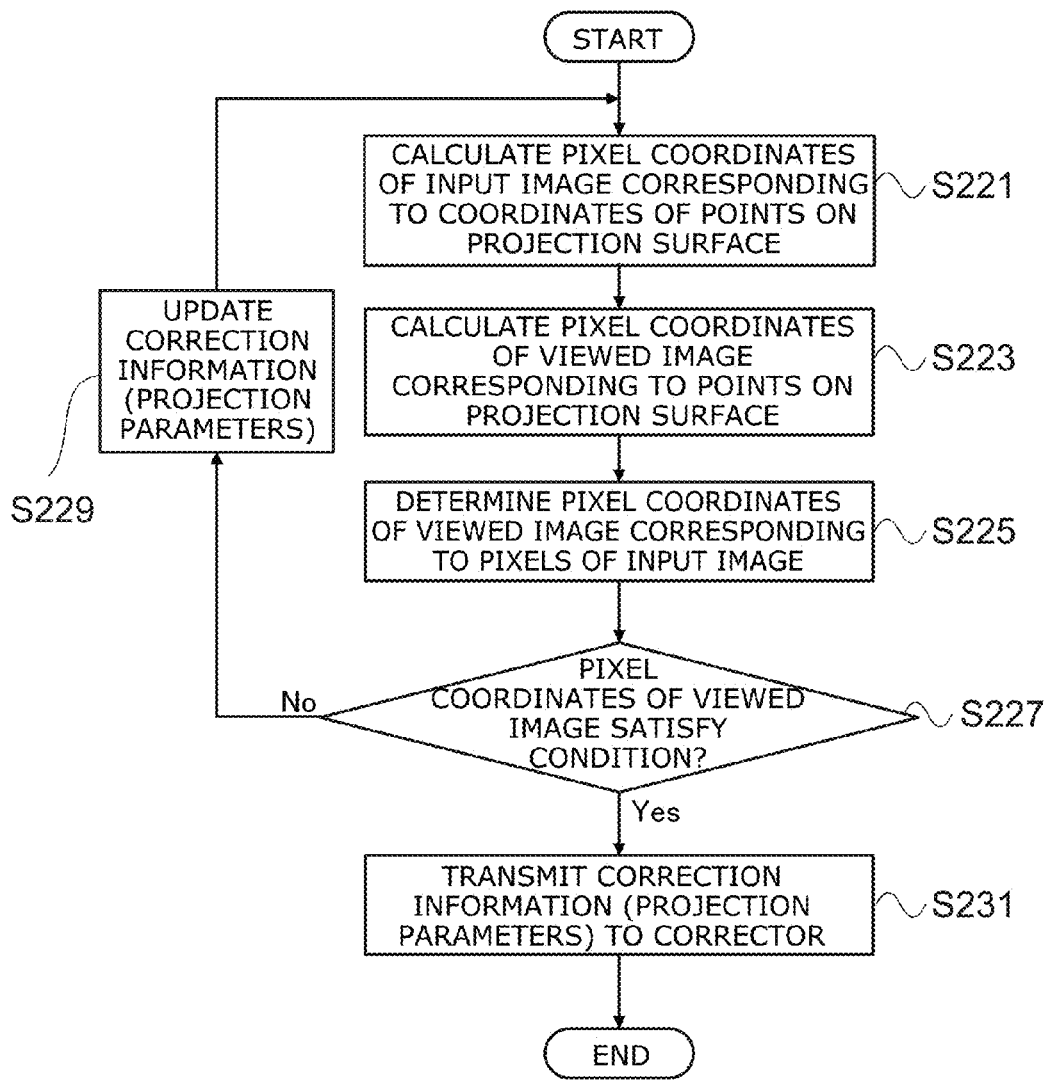
FIG. 10 is a flowchart showing processing of the setter of the embodiment.

FIG. 10 is a flowchart showing processing of the setter of the embodiment.

Figure 11A:
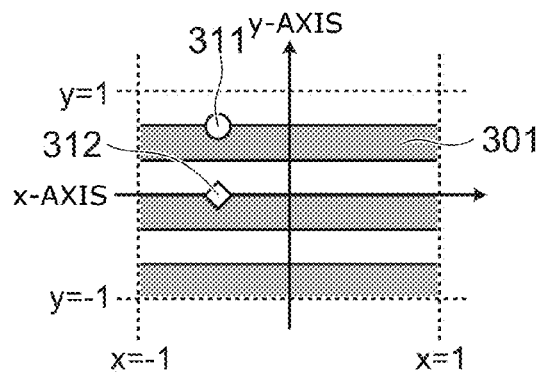
FIG. 11A to FIG. 11C are schematic plan views showing the input image and the viewed image with coordinate axes.
Figure 11B:
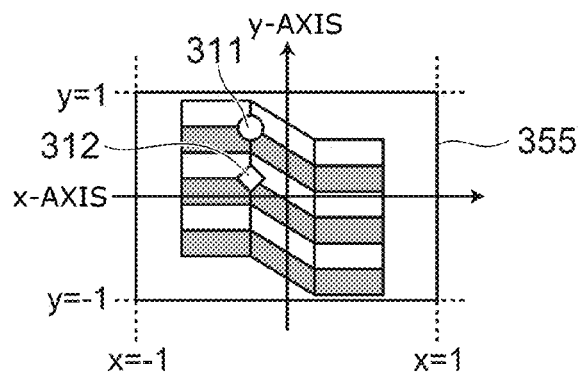
Figure 11C:
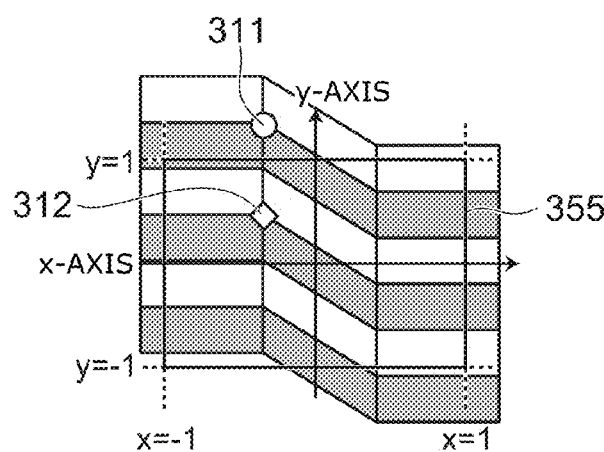

FIG. 11A to FIG. 11C are schematic plan views showing the input image and the viewed image with coordinate axes.

FIG. 11A is a schematic plan view showing the input image 301. FIG. 11B is a schematic plan view showing an example of the viewed image in which the projected image projected onto the projection surface by the input image 301 shown in FIG. 11A is viewed from the viewpoint. FIG. 11C is a schematic plan view showing another example of the viewed image in which the projected image projected onto the projection surface by the input image 301 shown in FIG. 11A is viewed from the viewpoint.

The setter 210 calculates the coordinates of the pixels of the input image 301 corresponding to the three-dimensional coordinates of the points on the projection surface 351 when the projector 120 virtually projects the image onto the projection surface (step S221). In FIG. 11A to FIG. 11C, the x-axis and the y-axis are set so that the centers of the input image and the viewed image pass through the origin. The minimum value of the x-coordinate of the screen 355 is "−1". The maximum value of the x-coordinate of the screen 355 is "1". The minimum value of the y-coordinate of the screen 355 is "−1". The maximum value of the y-coordinate of the screen 355 is "1". Here, a coordinate $m_p$ of a pixel of the input image is expressed by $m_p=(x_p, y_p)$; and a three-dimensional coordinate M of the position where the pixel of the input image 301 having the coordinate $m_p=(x_p, y_p)$ is projected onto the projection surface 351 is expressed by $M=(X_s, Y_s, Z_s)$. The relational expression between the coordinate $m_p=(x_p, y_p)$ of the pixel of the input image 301 and the three-dimensional coordinate $M=(X_s, Y_s, Z_s)$ on the projection surface 351 is expressed by the following formula.

$$\tilde{m}_P = P_P \cdot \tilde{M} \qquad \text{Formula (9)}$$

$\tilde{m}_P$ is the homogeneous coordinate of the viewed image $m_P$.

$\tilde{M}$ is the homogeneous coordinate of the projection surface M.

In Formula (9), $P_P$ is the perspective projection matrix when the projector 120 projects the image onto the projection surface 351. That is, the setter 210 executes a perspective projection transformation in the processing to calculate the coordinates of the pixels of the input image 301 corresponding to the three-dimensional coordinates of the points on the projection surface 351.

As shown in the following formula, the perspective projection matrix $P_P$ is expressed by internal parameters $A_P$ and external parameters $R_P$ and $t_P$.

$$P_P = A_P \cdot [R_P \cdot t_P] \qquad \text{Formula (10)}$$

Characteristics of the projector 120, etc., are expressed by the internal parameters $A_P$. For example, the internal parameters $A_P$ include the focal length of the lens included in the projector 120, the position (the coordinates) of (the image) center of the display element with respect to the optical axis of the lens included in the projector 120, etc.

The position of the image projector 100, the orientation of the image projector 100, etc., are expressed by the external parameters $R_P$ and $t_P$. For example, the position where the image projector 100 exists, the direction in which the image projector 100 projects the image, and the like with respect to an origin set arbitrarily in three-dimensional space are expressed by the external parameters $R_P$ and $t_P$.

The internal parameters $A_P$ and the external parameters $R_P$ and $t_P$ will now be described further with reference to FIG. 12A, FIG. 12B, and FIG. 13.

Figure 12A:
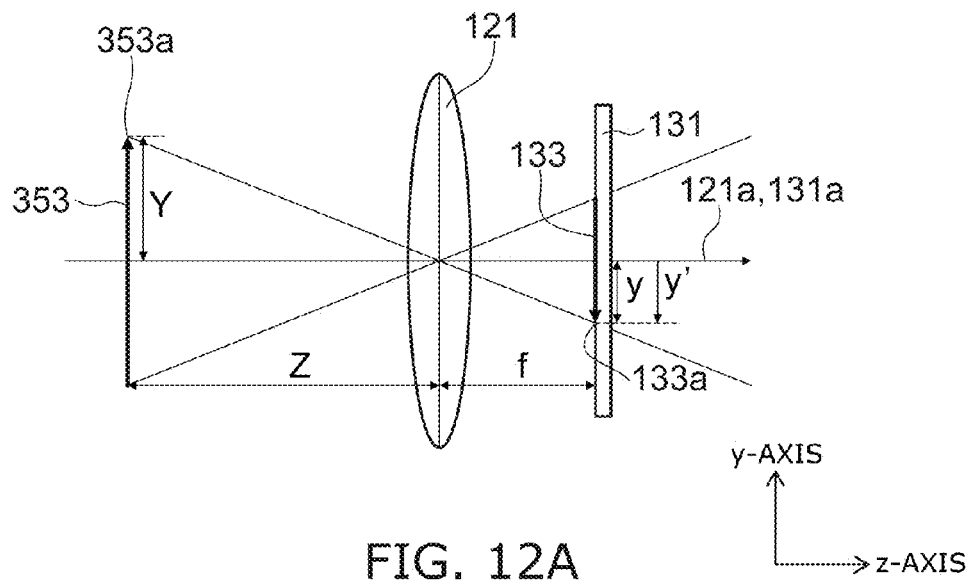
FIG. 12A and FIG. 12B are schematic plan views describing the internal parameters $A_P$.
Figure 12B:
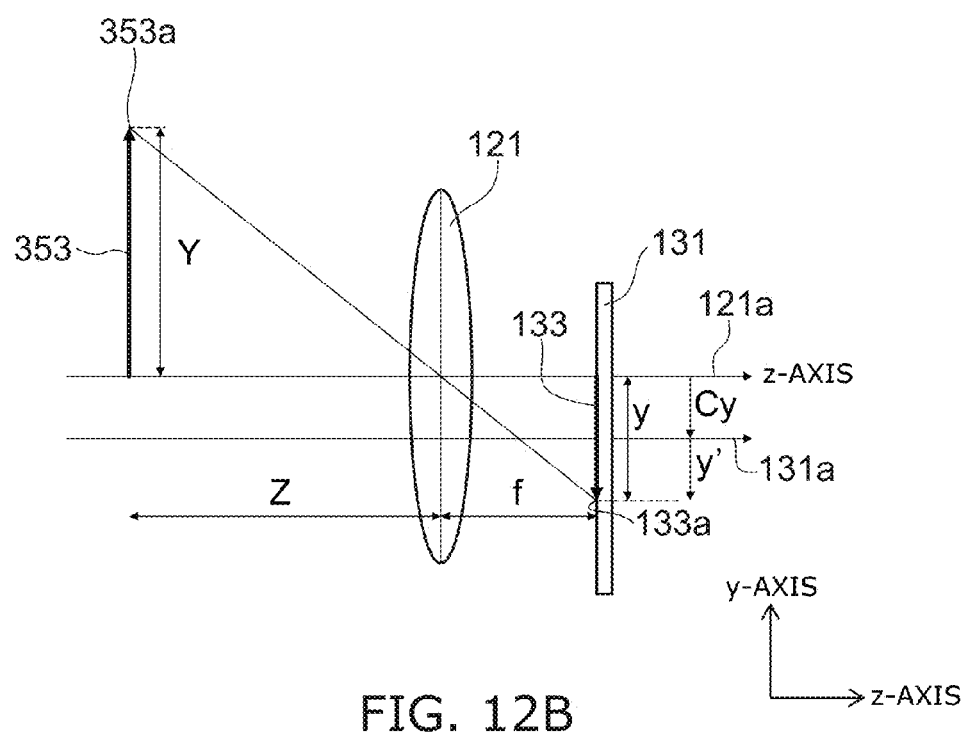

FIG. 12A and FIG. 12B are schematic plan views describing the internal parameters $A_P$.

Figure 13:
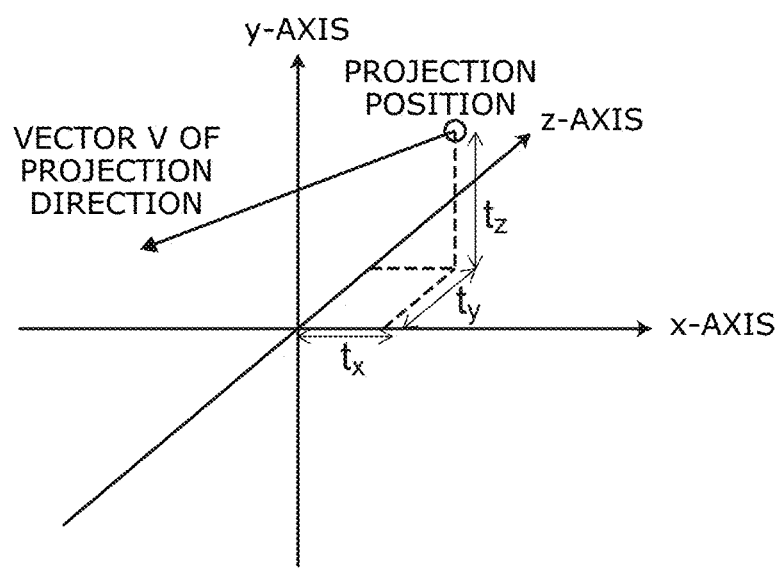
FIG. 13 is a schematic perspective view describing the external parameters $R_P$ and $t_P$.

FIG. 13 is a schematic perspective view describing the external parameters $R_P$ and $t_P$.

FIG. 12A is a schematic plan view illustrating the case where the optical axis of the lens matches the center of the display element. FIG. 12B is a schematic plan view illustrating the case where the optical axis of the lens is shifted in the y-direction from the center of the display element. FIG. 12A and FIG. 12B are schematic plan views of the yz plane.

First, the internal parameters $A_P$ will be described.

For the examples shown in FIG. 12A and FIG. 12B, the following formula holds for a distance Y between an optical axis 121a of a lens 121 and an edge 353a of an object 353, a distance y between the optical axis 121a of the lens 121 and an edge 133a of a projection image 133, a distance Z between the lens 121 and the object 353, and the focal length f.

$$y = \frac{Y}{Z}f \qquad \text{Formula (11)}$$

In the example shown in FIG. 12A, the following formula holds for the y-coordinate y' of the projection image 133 on a display element 131 because the optical axis 121a of the lens 121 matches a center 131a of the display element 131.

$$y'=y \qquad \text{Formula (12)}$$

Therefore, the coordinates $(c_x, c_y)$ of the position of the center 131a of the display element 131 with respect to the optical axis 121a of the lens 121 are (0, 0). That is, $c_x=0$ and $c_y=0$.

On the other hand, in the example shown in FIG. 12B, the optical axis 121a of the lens 121 is shifted in the y-direction from the center 131a of the display element 131. Therefore, the following formula holds for the y-coordinate y' of the projection image 133 on the display element 131.

$$y'=y+c_y \qquad \text{Formula (13)}$$

Therefore, $c_y=0$ does not hold for the y-coordinate $c_y$ of the position of the center 131a of the display element 131 with respect to the optical axis 121a of the lens 121. That is, the coordinate $c_y$ has a value other than 0 according to the optical axis 121a of the lens 121 and the position of (the pixel) center of the display element 131. In the case where the optical axis 121a of the lens 121 is shifted in the x-direction from the center 131a of the display element 131, $c_x=0$ does not hold for the x-coordinate $c_x$ of the position of the center 131a of the display element 131 with respect to the optical axis 121a of the lens 121.

The internal parameters $A_p$ are expressed by the following formula.

$$A_P = \begin{bmatrix} f_x & 0 & c_x \\ 0 & f_y & c_y \\ 0 & 0 & 1 \end{bmatrix} \qquad \text{Formula (14)}$$

As described above, the coordinates $(c_x, c_y)$ of the position of the center 131a of the display element 131 with respect to the optical axis 121a of the lens 121 are expressed by $c_x$ and $c_y$ of Formula (14). The focal lengths $f_x$ and $f_y$ of the lens 121 expressed in pixel units are expressed by $f_x$ and $f_y$ of Formula (14). As shown in Formula (14), the internal parameters $A_p$ are parameters including the coordinates $(c_x, c_y)$ of the position of the center 131a of the display element 131 with respect to the optical axis 121a of the lens 121 and the focal lengths $f_x$ and $f_y$ of the lens 121 expressed in pixel units.

The external parameters $R_P$ and $t_P$ will now be described.

The external parameter $t_P$ is a parameter of the translation of the projection position. The matrix relating to the external parameter $t_P$ is a translation matrix t for setting the projection position to be the origin. In the example shown in FIG. 13, the translation matrix t is expressed by the following formula.

$$t = \begin{pmatrix} t_x \\ t_y \\ t_z \end{pmatrix} \qquad \text{Formula (15)}$$

The external parameter $R_P$ is a parameter of the projection direction of the projector 120. The matrix relating to the external parameter $R_P$ is a rotation matrix R for transforming the coordinates so that a vector V of the projection direction is the z-axis. The rotation matrix R is expressed by the following formula.

$$R = \begin{pmatrix} R_1 & R_2 & R_3 \\ R_4 & R_5 & R_6 \\ R_7 & R_8 & R_9 \end{pmatrix} \qquad \text{Formula (16)}$$

Thereby, the external parameter matrix $[R_P \cdot_P]$ is the transformation matrix for transforming the coordinates of the projection surface 351 expressed in the world coordinates into the coordinates of the image projector 100 having the projection position as the origin and the projection direction as the z-axis.

As an example of the rotation matrix, a rotation matrix $R_x$ for rotating the coordinates (x, y, z) around the x-axis by an angle α is expressed by the following formula.

$$R_x = \begin{pmatrix} 1 & 0 & 0 \\ 0 & \cos\alpha & \sin\alpha \\ 0 & \sin\alpha & \cos\alpha \end{pmatrix} \qquad \text{Formula (17)}$$

Also, as an example of the rotation matrix, a rotation matrix $R_y$ for rotating the coordinates (x, y, z) around the y-axis by an angle β is expressed by the following formula.

$$R_y = \begin{pmatrix} \cos\beta & 0 & \sin\beta \\ 0 & 1 & 0 \\ -\sin\beta & 0 & \cos\beta \end{pmatrix} \qquad \text{Formula (18)}$$

Also, as an example of the rotation matrix, a rotation matrix $R_z$ for rotating the coordinates (x, y, z) around the z-axis by an angle γ is expressed by the following formula.

$$R_z = \begin{pmatrix} \cos\gamma & -\sin\gamma & 0 \\ \sin\gamma & \cos\gamma & 0 \\ 0 & 0 & 1 \end{pmatrix} \qquad \text{Formula (19)}$$

As described above in regard to FIG. 3 to FIG. 5C, the acquisition unit 110 calculates the configuration information 112 of the projection surface 351. Therefore, the three-dimensional coordinates of the points forming the projection surface 351 are known. Therefore, the coordinates of the pixels of the input image 301 that is projected are calculated by Formula (9) for the multiple points forming the projection surface 351. However, in the case where the coordinates (x, y) of a pixel of the input image 301 calculated by Formula (9) do not satisfy the condition of the following formula (Formula (20)), this means that the point corresponding to the coordinates (x, y) on the projection surface 351 exists in an area outside the input image 301. Therefore, the subsequent processing is performed on the points on the projection surface 351 for which the coordinates (x, y) of the pixels of the input image 301 satisfy the condition of Formula (20). The processing is described returning to FIG. 10.

$$|x| \leq 1 \text{ and } |y| \leq 1 \quad \text{Formula (20)}$$

In the embodiment as shown in FIG. 11A to FIG. 11C, the coordinates have the condition of Formula (20) because the ranges of the coordinates of the input image 301 and the coordinates of the viewed image are normalized so that $-1 \leq x \leq 1$ and $-1 \leq y \leq 1$. According to the normalization of the coordinates of the input image 301 and the coordinates of the viewed image, the condition of the coordinates is not limited to Formula (20).

Continuing from the processing described above in regard to step S221, the setter 210 calculates the coordinates of the pixels of the viewed image corresponding to the three-dimensional coordinates of the points on the projection surface 351 when the projection surface 351 is viewed from the viewpoint (step S223). Here, the coordinate $m_c$ of a pixel of the viewed image is expressed as $m_c=(x_c, y_c)$; and the three-dimensional coordinate M of the projection surface 351 at the position corresponding to the coordinate $m_c=(x_c, y_c)$ is expressed as $M=(X_s, Y_s, Z_s)$. The relational expression between the pixel $m_c=(x_c, y_c)$ of the viewed image and the three-dimensional coordinate $M=(X_s, Y_s, Z_s)$ on the projection surface 351 is expressed by the following formula.

$$m_C \approx P_C \cdot \tilde{M} \quad \text{Formula (21)}$$

$P_C$ of Formula (21) is a perspective projection matrix when the projection surface 351 is viewed from the position of the viewpoint having coordinates $(X_C, Y_C, Z_C)$. That is, the setter 210 executes a perspective projection transformation in the processing to calculate the coordinates of the pixels of the viewed image corresponding to the three-dimensional coordinates of the points on the projection surface 351. In the embodiment as described above in regard to FIG. 8 to FIG. 9C, the viewing of the projection surface 351 is assumed to be performed using an imaging device such as a camera, etc., from the viewpoint. Therefore, a perspective projection matrix $P_C$ is determined by the internal parameters and the external parameters of the imaging device. The details of the internal parameters and the external parameters are similar to those of the perspective projection matrix $P_P$ of the projector 120 and can be determined beforehand by a calibration.

Then, using Formula (9) and Formula (21), the setter 210 calculates the coordinates $(x_p, y_p)$ of the pixels on the input image 301 corresponding to the points on the projection surface 351 at the coordinates $(X_s, Y_s, Z_s)$, calculates the coordinates $(x_c, y_c)$ of the pixels on the viewed image corresponding to the points on the projection surface 351 at the coordinates $(X_s, Y_s, Z_s)$, and determines the correspondence between the coordinates $(x_p, y_p)$ of the pixels on the input image 301 and the coordinates $(x_c, y_c)$ of the pixels on the viewed image (step S225).

Here, as shown in FIG. 11A, two pixels (a first pixel 311 and a second pixel 312) of the input image 301 are described as an example. For the first pixel 311, the condition of Formula (20) is not satisfied when transforming the coordinates of the input image 301 into the coordinates of the viewed image shown in FIG. 11C. Therefore, as shown in FIG. 11C, the first pixel 311 is not within the area of the screen 355 of the viewed image.

On the other hand, the second pixel 312 is within the area of the screen 355 of the viewed image when the coordinates of the input image 301 are transformed into the coordinates of the viewed image shown in FIG. 11C. Therefore, as shown in FIG. 11C, the second pixel 312 can be confirmed as being inside the viewed image.

Thus, to cause the entire input image 301 to be within the area of the screen 355 of the viewed image, it is necessary for the coordinates $(x_c, y_c)$ of the pixels of the viewed image corresponding to the coordinates $(x_p, y_p)$ of the pixels of the input image 301 determined by Formula (9) and Formula (21) to satisfy the condition of Formula (20).

Therefore, the setter 210 uses Formula (9) and Formula (21) to calculate the coordinates of the pixels of the viewed image corresponding to the coordinates of the pixels of the input image 301 for the correction information (the projection parameter) 212 that is set, and determines whether or not the coordinates of the pixels of the viewed image that are calculated satisfy the condition of Formula (20) (step S227). In the case where it is determined that coordinates of pixels exist among the coordinates of the pixels of the viewed image corresponding to the coordinates of the pixels of the input image 301 that do not satisfy the condition of Formula (20) (step S227: No), the setter 210 updates the correction information 212 (step S229) and repeats the processing of step S221 to step S227. In the case where it is determined that the coordinates of each of the pixels of the viewed image corresponding to the coordinates of the pixels of the input image 301 calculated from the points on the projection surface 351 satisfy the condition of Formula (20) (step S227: Yes), the setter 210 transmits the correction information (the projection parameters, i.e., the information relating to the size and position) 212 that is set to the corrector 220 (step S231).

The method for updating the correction information 212 will now be described with reference to the drawings.

Figure 14A:
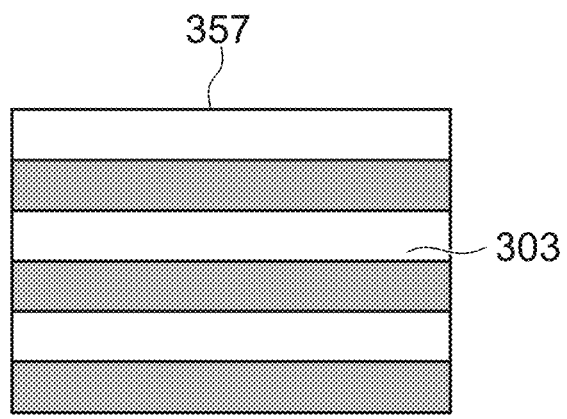
FIG. 14A to FIG. 14C are schematic plan views describing the method for updating the correction information of the embodiment.
Figure 14B:
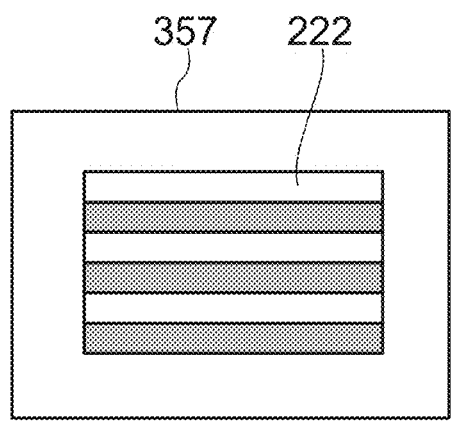
Figure 14C:
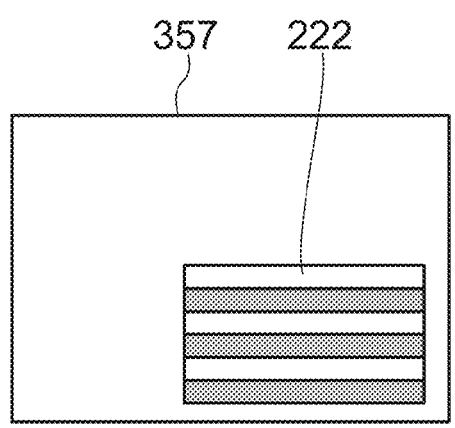

FIG. 14A to FIG. 14C are schematic plan views describing the method for updating the correction information of the embodiment.

FIG. 14A is a schematic plan view showing the projected image when an image that uses the projection area to the utmost is projected. FIG. 14B is a schematic plan view showing the projected image in which the size of the image is reduced to be within the projection area. FIG. 14C is a schematic plan view showing the projected image in which the size of the image is reduced to be within the projection area and the position of the reduced image is moved.

Specifically, for the internal parameters shown in Formula (14), the projection angle of a projected image 303 can be changed by changing the focal lengths $f_x$ and $f_y$. Therefore, in the case where a pixel exists that does not satisfy the condition of Formula (20), the size of the image inside a projection area 357 can be reduced as in the corrected image 222 shown in FIG. 14B by reducing the projection angle by increasing the values of the focal lengths $f_x$ and $f_y$ of Formula (14). Also, the projection direction can be changed by changing the external parameter $R_P$ (the rotation parameter) of Formula (10). Therefore, the position of the image inside the projection area 357 can be modified as in the corrected image 222 shown in FIG. 14C by changing the rotation parameter.

As described above, the setter 210 resets the correction information 212 and repeats the processing of calculating and evaluating the pixels of the viewed image corresponding to the projected image (the corrected image 222) when virtually projected from the projector 120 based on the correction information 212 that is reset (steps S221 to S229). The setter 210 repeats the processing of steps S221 to S229 until the positions of the pixels of the viewed image corresponding to each of the pixels of the projected image satisfy the condition of Formula (20). The setter 210 transmits the correction information 212 (the information relating to the size and the information relating to the position) that is ultimately calculated to the corrector 220 (step S231). In step S227 in the embodiment, the determination is performed so that the coordinates of each of the pixels of the viewed image satisfy Formula (20). However, each pixel may not be used for the determination. For example, the determination of Formula (20) may be performed for pixels of the viewed image corresponding to pixels of edges of the projected image. "Pixels of edges of the projected image" refer to pixels positioned at the edges of the projected image or pixels included inside the projected image in a relatively outward region.

Based on the correction information (the projection parameter) 212 including the information relating to the size of the image and the information relating to the position of the image transmitted from the setter 210, the corrector 220 generates the corrected image 222 in which the input image 301 is corrected and transmits the corrected image 222 to the projector 120. The projector 120 projects the corrected image 222 toward the projection surface 351.

Thus, according to the embodiment, the setter 210 determines the two-dimensional coordinates of the pixels of the input image 301 corresponding to the three-dimensional coordinates of the projection surface 351 and the two-dimensional coordinates of the pixels of the viewed image corresponding to the three-dimensional coordinates of the projection surface 351. Thereby, even in the case where the image is projected onto the target object 350 including the projection surface 351 that is non-planar, it is unnecessary to image the projection surface 351 from the viewpoint position, update the correction information 212, and repeat the generation, projection, imaging, and verification of the image. Also, it is possible to determine the size of the image and the position of the image so that the input image 301 is within the area of the screen 355 of the viewed image; and it is possible to display the information of the input image 301 within the area of the screen 355 of the viewed image.

Another embodiment of the invention will now be described.

Figure 15:
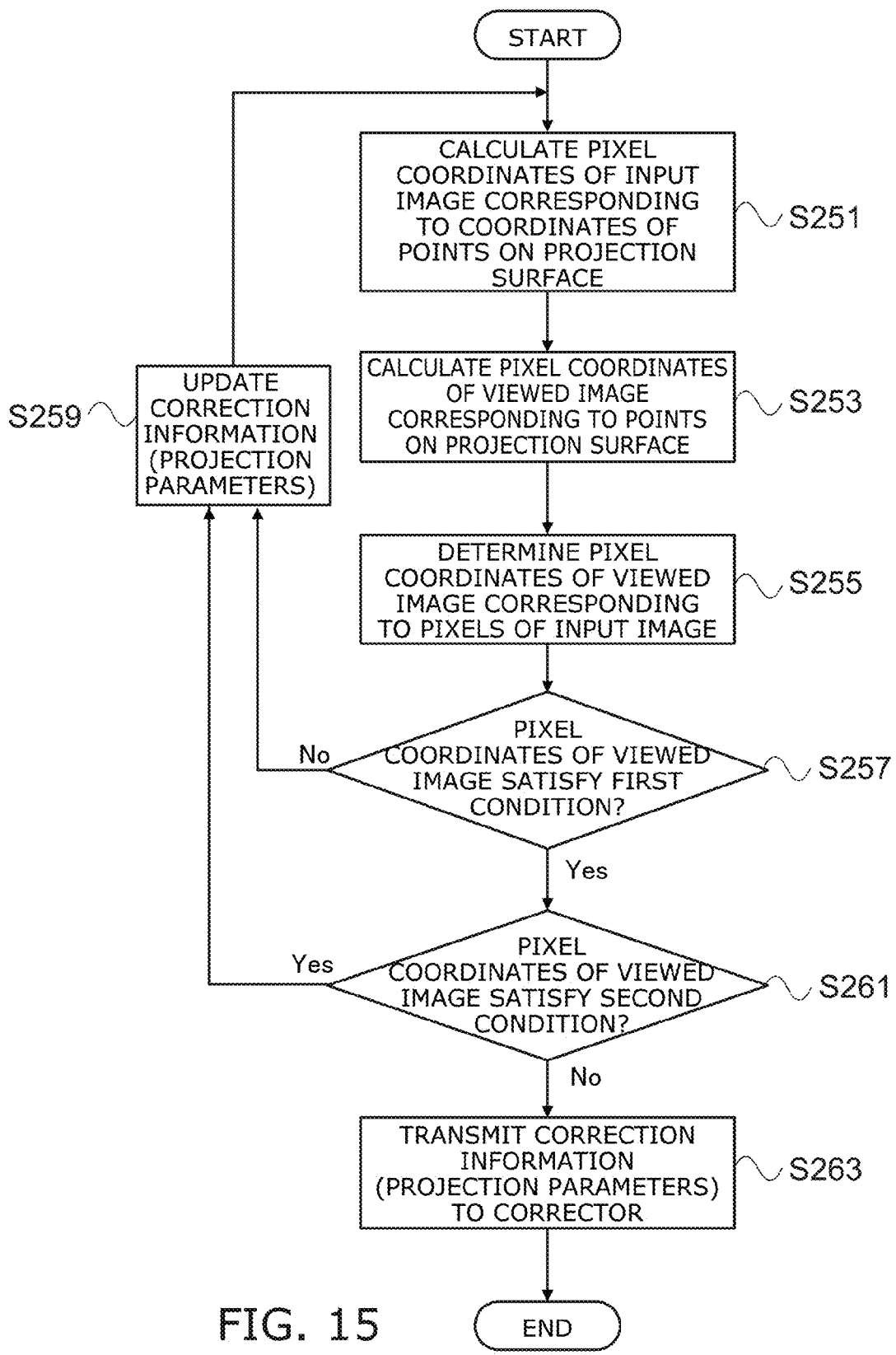
FIG. 15 is a flowchart describing an image processing method according to a modification of the embodiment. The overall configuration of the embodiment is similar to the configuration of the embodiment described above.

FIG. 15 is a flowchart describing an image processing method according to a modification of the embodiment. The overall configuration of the embodiment is similar to the configuration of the embodiment described above.

The setter 210 of the embodiment sets the correction information 212 so that the information of the entire input image 301 is within the area of the screen 355 of the viewed image and the size of the input image 301 is maximized. This aspect is different from the embodiment described above in regard to FIG. 1 to FIG. 14C.

The setter 210 of the embodiment will now be described.

As described above in regard to FIG. 10, the setter 210 updates the correction information 212 of the input image 301 and calculates the correction information 212 so that the information of the entire input image 301 is within the area of the screen 355 of the viewed image (steps S251 to S259). At this time, according to the initial value of the correction information 212 and/or the method for updating the correction information 212, there is a possibility that the viewed image at the viewpoint may be too small for the projection area 357 (referring to FIG. 14C) and may not use the projection area 357 to the utmost.

Conversely, the setter 210 of the embodiment performs a determination (step S261) using a second condition for the coordinates of the pixels of the viewed image that satisfied the condition (the first condition) of Formula (20) in step S257. In the case where the coordinates of each of the pixels of the viewed image satisfy the second condition, the setter 210 updates the correction information 212 (step S259) and repeats the processing of steps S251 to S257. The formula of the second condition is expressed by the following formula.

$$|x| \leq Th \text{ and } |y| \leq Th \qquad \text{Formula (22)}$$

In Formula (22), "Th" is the threshold for the x-coordinate and the y-coordinate of the viewed image and is a value near 1 but less than 1. For example, in the case where the threshold Th is set to 0.9, the correction information 212 is updated so that each of the pixels is within the area of the screen 355 of the viewed image, and the value of the x-coordinate or the y-coordinate of at least one pixel of the pixels of the viewed image is greater than 0.9 based on the conditions of Formula (20) and Formula (22). In the case where Formula (22) is satisfied, the pixels of the input image 301 are distributed to concentrate more toward the center of the viewed image and the input image 301 is displayed to be smaller for the viewed image as the threshold Th is reduced. Therefore, in the case where each of the pixels of the viewed image satisfy Formula (22), the setter 210 updates the correction information 212 and repeats the processing of steps S251 to S257 and step S261 so that the input image 301 is projected to be larger.

The setter 210 transmits the correction information 212 (the information relating to the size and the information relating to the position) that is ultimately calculated in step S263 to the corrector 220 (step S263). Based on the correction information (the projection parameter) 212 including the information relating to the size of the image and the information relating to the position of the image transmitted from the setter 210, the corrector 220 generates the corrected image 222 in which the input image 301 is corrected and transmits the corrected image 222 to the projector 120. The projector 120 projects the corrected image 222 toward the projection surface 351.

The setter 210 determines the size of the image and the position of the image so that the input image 301 is within the area of the screen 355 of the viewed image; and it is possible to display as much information of the input image 301 as possible to be as large as possible within the area of the screen 355 of the viewed image.

Another embodiment of the invention will now be described.

Figure 16:
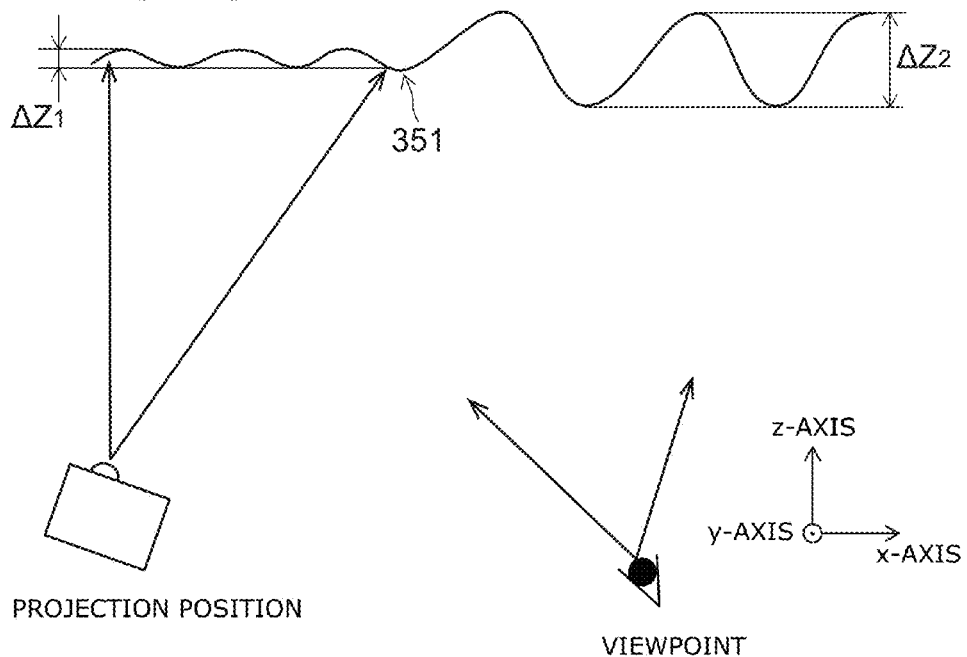
FIG. 16 is a schematic plan view describing an image projector according to a modification of the embodiment.

FIG. 16 is a schematic plan view describing an image projector according to a modification of the embodiment.

The setter 210 of the embodiment sets the correction information 212 so that each of the pixels of the input image 301 is within the area of the screen 355 of the viewed image, and the pixels of the input image 301 are projected onto the projection surface 351 where the range of the depths from the projection position to the projection surface 351 is a relatively small range. In other words, each of the pixels of the input image 301 is within the area of the screen 355 of the viewed image; and multiple distances between the projection position and each of the points on the projection surface 351 are calculated. The setter 210 sets the correction information 212 so that the projection onto the projection surface 351 is in an area in which the multiple distances are near each other. This aspect is different from the embodiment described above in regard to FIG. 1 to FIG. 14C.

Based on the three-dimensional coordinates of the points on the projection surface 351, the setter 210 detects areas of points of which the depth values (the z-coordinates) are near each other. Specifically, the setter 210 performs clustering using the depth value (the z-coordinate) for all of the points on the projection surface 351. The method for clustering may include, for example, a k-means method, a region unification method, etc. By applying the methods for the clustering of the examples, etc., clustering of the points of which the depth values (the z-coordinates) are near each other is performed for the points forming the projection surface 351. As a result of the clustering, the setter 210 determines the cluster having the highest number of points to be a region where the depth values are near each other; and the setter 210 sets the correction information 212 to have a projection position so that the point on the projection surface 351 that is the centroid of the cluster is used as the center of the projection. In the case where the centroid of the cluster is not on the projection surface 351, the setter 210 sets the correction information 212 so that the point where the centroid is projected onto the projection surface 351 matches the center. The direction in which the centroid is projected may be a direction perpendicular to the projection surface 351 or may be the projection direction. Thereafter, the setter 210 repeats the processing of steps S221 to S229 described above in regard to FIG. 10 and updates the correction information 212 to have a size of the projection screen so that the information of the input image 301 is within the area of the screen 355 of the viewed image.

In the update of the correction information 212 of the embodiment, the setter 210 updates the parameter of the size of the image. The correction information 212 including the projection position of the image is set when setting the initial value of the correction information 212. The setter 210 transmits the correction information 212 that is set to the corrector 220. The corrector 220 generates the corrected image 222 based on the correction information 212 and transmits the corrected image 222 to the projector 120. The projector 120 projects the corrected image 222.

The setter 210 can determine the size of the image and the position of the image so that the input image 301 is within the area of the screen 355 of the viewed image and can display the information of the input image 301 in an easily-viewable area of the screen 355 of the viewed image in which the depths are near each other.

Another embodiment of the invention will now be described.

Figure 17:
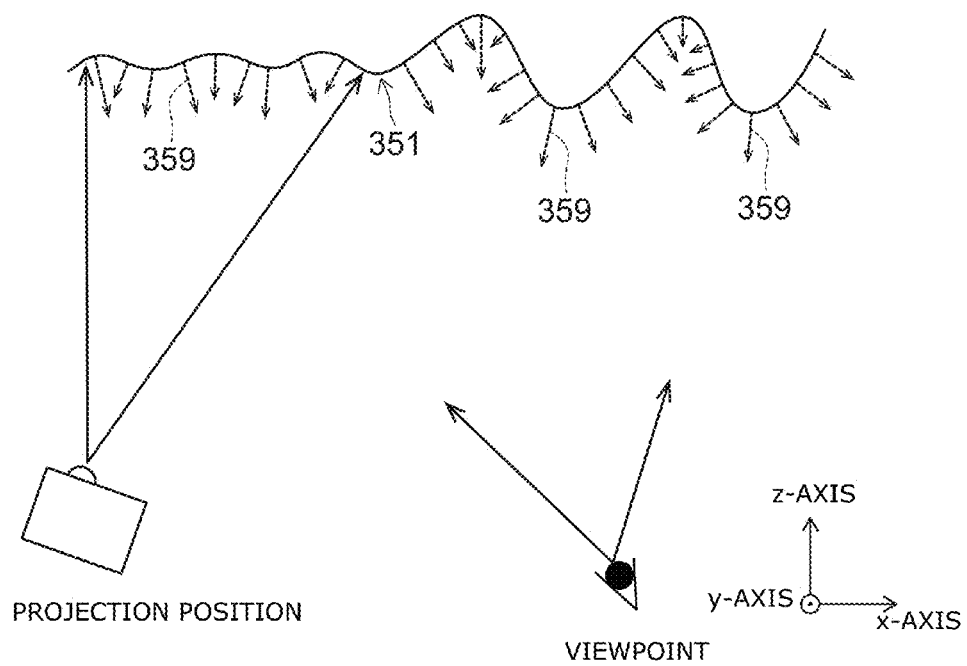
FIG. 17 is a schematic plan view describing an image projector according to a modification of the embodiment.

FIG. 17 is a schematic plan view describing an image projector according to a modification of the embodiment. The overall configuration of the embodiment is similar to the configuration of the embodiment described above.

The setter 210 of the embodiment sets the correction information 212 so that each of the pixels of the input image 301 is within the area of the screen 355 of the viewed image and is projected onto the projection surface 351 having an area in which the depth changes smoothly like a plane. This aspect is different from the embodiment described above in regard to FIG. 1 to FIG. 14C.

Based on the three-dimensional coordinates of the points on the projection surface 351, the setter 210 calculates the information relating to normal vectors 359 of the points. Specifically, at each of the points on the projection surface 351, the three-dimensional coordinates of three points, i.e., a first point on the projection surface 351 and two points (a second point and a third point) neighboring the first point, are substituted into the equation of a plane expressed by the following formula (Formula (23)); and the coefficients of the equation of a plane, i.e., the normal vector 359, are calculated from the simultaneous equations. The method for calculating the normal vector 359 is not limited to this method, and other methods for calculating may be used.

$$ax+by+cz=1 \qquad \text{Formula (23)}$$

After calculating the normal vector 359 of each of the points of the projection surface 351, the setter 210 performs clustering using the normal vectors 359 and the depth values (the z-coordinates) of all of the points on the projection surface 351 similarly to the embodiment described above in regard to FIG. 16.

Specifically, the setter 210 performs clustering of the points of which the normal vectors 359 are near each other and the points of which the depth values are near each other.

As a result of the clustering, the setter 210 determines the cluster having the highest number of points to be the region where the normal vectors 359 are nearest each other and the depth values (the z-coordinates) are nearest each other, i.e., the region nearest a plane in which the depth changes smoothly; and the setter 210 sets the correction information 212 to have a projection position so that the point on the projection surface 351 used as the centroid of the cluster is the center of the projection. In the case where the centroid of the cluster is not on the projection surface 351, the setter 210 sets the correction information 212 so that the point where the centroid is projected onto the projection surface 351 matches the center. The direction of the projection of the centroid may be a direction perpendicular to the projection surface 351 or may be the projection direction. Thereafter, the setter 210 repeats the processing of steps S221 to S229 described above in regard to FIG. 10 and updates the correction information 212 to have a size of the projection screen so that the information of the input image 301 is within the area of the screen 355 of the viewed image.

In the update of the correction information 212 of the embodiment, the setter 210 updates a parameter of the size of the image but does not update a parameter of the position of the image. This is as described above in regard to FIG. 16. The setter 210 transmits the correction information 212 that is set to the corrector 220. The corrector 220 generates the corrected image 222 based on the correction information 212 and transmits the corrected image 222 to the projector 120. The projector 120 projects the corrected image 222.

Thus, according to the embodiment, effects are obtained that are similar to the effects obtained in the embodiments described above in regard to FIG. 1 to FIG. 14C. The setter 210 can determine the size of the image and the position of the image so that the input image 301 is within the area of the screen 355 of the viewed image; and the setter 210 can display the information of the input image 301 to be in the area of the screen 355 of the viewed image in which the depth changes smoothly.

Another embodiment of the invention will now be described.

Figure 18A:
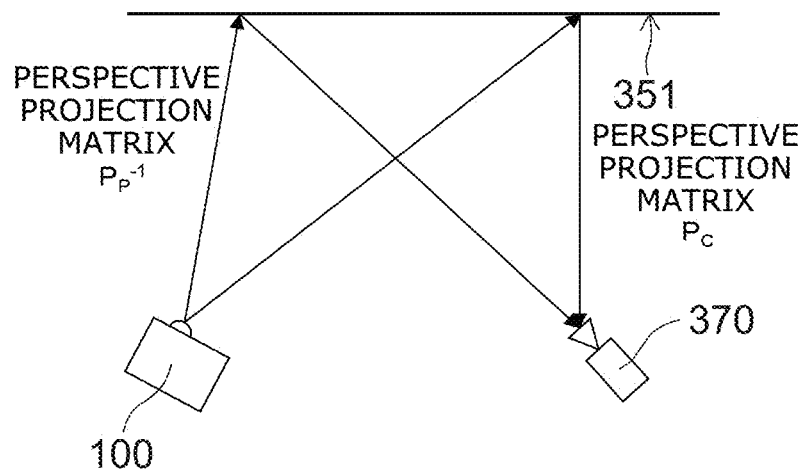
FIG. 18A and FIG. 18B are schematic plan views describing an image projector according to a modification of the embodiment.
Figure 18B:
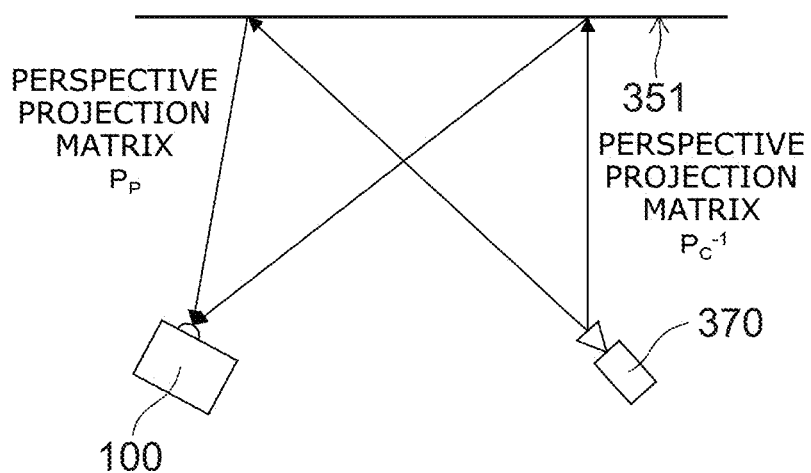

FIG. 18A and FIG. 18B are schematic plan views describing an image projector according to a modification of the embodiment.

The overall configuration of the embodiment is similar to the configuration of the embodiment described above in regard to FIG. 1 to FIG. 14C. Here, the difference between the embodiment and the embodiments described above in regard to FIG. 1 to FIG. 14C will be described.

The setter 210 of the embodiment sets the correction information 212 (the information relating to the size of the image and the information relating to the position) so that the entire virtual input image is included within the area of the screen 355 of the virtual viewed image when the input image is virtually projected onto the projection surface 351 from the viewpoint position and the projection surface 351 is virtually viewed from the projection position. This aspect is different from the embodiment described above in regard to FIG. 1 to FIG. 14C.

Also, based on the correction information 212 set by the setter 210, the corrector 220 generates, as the corrected image 222, the viewed image virtually viewed from the projection position when the input image is virtually projected onto the projection surface 351 from the viewpoint position and transmits the corrected image 222 to the projector 120. This aspect is different from the embodiment described above in regard to FIG. 1 to FIG. 14C.

The setter 210 and the corrector 220 will now be described.

The distortion when the image is projected onto the projection surface 351 will be described with reference to FIG. 18A and FIG. 18B. The positional relationship between the projection surface 351, the image projector 100, and an imaging device 370 is, for example, as shown in FIG. 18A and FIG. 18B.

As shown in FIG. 18A, the case is considered where the image projector 100 projects the input image onto the projection surface 351 and the imaging device 370 images the projected image projected onto the projection surface 351. At this time, the image that is imaged by the imaging device 370 is used as the viewed image. A position $x_C1$ is the position of the pixel of the viewed image corresponding to the pixel at a position $x_P$ of the input image. Using the perspective projection matrix $P_P$ of the image projector 100 and the perspective projection matrix $P_C$ of the imaging device 370, the relationship between the position $x_P$ of the pixel and the position $x_C1$ of the pixel are expressed by the following formula.

$$x_C1 = P_C \cdot P_P^{-1}(x_P) \quad \text{Formula (24)}$$

On the other hand, as shown in FIG. 18B, the case is considered where the imaging device 370 virtually projects the input image onto the projection surface 351; and the image projector 100 virtually images the projected image projected onto the projection surface 351. A position $x_C2$ is the position of the pixel of the virtual viewed image corresponding to the pixel of the position $x_P$ of the virtual input image. The relationship between the position $x_P$ of the pixel and the position $x_C2$ of the pixel is expressed by the following formula.

$$x_C2 = P_P \cdot P_C^{-1}(x_P) \quad \text{Formula (25)}$$

From Formula (24) and Formula (25), it can be seen that the distortion of the image projected from the position of the image projector 100 and imaged at the position of the imaging device 370 is the predistortion of the distortion of the image virtually projected from the position of the imaging device 370 and virtually imaged at the position of the image projector 100. Accordingly, as shown in the following formula (Formula (26)), the distortion is canceled if the image virtually projected from the position of the imaging device 370 and virtually imaged at the position of the image projector 100 is projected from the position of the image projector 100 and viewed at the position of the imaging device 370. Therefore, it is possible to perform the display while suppressing the geometrical distortion of the original image (input image).

$$x_C1 = P_C \cdot P_P^{-1}(x_P) = x_P \quad \text{Formula (26)}$$

Thus, the image processor 200 according to the embodiment calculates, as the corrected image 222, the viewed image that is virtually viewed at the projection position when the input image is virtually projected onto the projection surface 351 from the viewpoint position. The image projector 100 according to the embodiment performs the image display while suppressing the distortion when the projection surface 351 is viewed from the viewpoint by projecting the corrected image 222 onto the projection surface 351 from the projector 120.

The operation of the setter 210 of the embodiment will now be described with reference to FIG. 8.

The setter 210 of the embodiment calculates the pixels that correspond to the pixels of the virtual input image and are the pixels of the virtual viewed image obtained by virtually viewing the projection surface 351 from the projection position when the input image is virtually projected onto the projection surface 351 from the viewpoint position. The setter 210 performs the processing of steps S221 to S231 described above in regard to FIG. 10 so that the entire area of the virtual input image is within the virtual viewed image.

In the case where the input image is virtually projected from the viewpoint position, the setter 210 calculates the two-dimensional coordinates of the virtual input image from the three-dimensional coordinates of the points on the projection surface 351 based on the perspective projection matrix $P_C$ of the imaging device 370. In the case where the projected image that is virtually projected onto the projection surface 351 is virtually viewed from the projection position, the setter 210 calculates the two-dimensional coordinates of the virtual viewed image from the three-dimensional coordinates of the points on the projection surface 351 based on the perspective projection matrix $P_P$ of the image projector 100.

Here, a coordinate $m_p'$ of a pixel of the virtual input image is expressed by $m_p' = (x_p', y_p')$; and the three-dimensional coordinate M of the position where the pixel of the coordinate $m_p' = (x_p', y_p')$ is virtually projected onto the projection surface 351 is expressed by $M = (X_s, Y_s, Z_s)$. The relationship between the coordinate $m_p' = (x_p', y_p')$ of the pixel of the virtual input image and the three-dimensional coordinate $M = (X_s, Y_s, Z_s)$ on the projection surface 351 is expressed by the following formula.

$$\tilde{m}_P = P_C \cdot \tilde{M} \quad \text{Formula (27)}$$

$\tilde{m}'_P$ is the homogeneous coordinate of the viewed image $m_P'$.

$\tilde{M}$ is the homogeneous coordinate of the projection surface M.

In Formula (27), $P_C$ is the perspective projection matrix when the projection surface 351 is viewed from the position of the viewpoint at the coordinates $(X_C, Y_C, Z_C)$. That is, the setter 210 executes a perspective projection transformation based on the perspective projection matrix when the projection surface 351 is viewed from the position of the viewpoint in the processing to calculate the coordinates of the pixels of the virtual input image corresponding to the three-dimensional coordinates of the points on the projection surface 351.

On the other hand, for a coordinate $m_c'$ expressed by $m_c'=(x_c', y_c')$ of a pixel of the virtual viewed image when the projection surface 351 is virtually viewed from the projection position, the relationship between the three-dimensional coordinate $M=(X_s, Y_s, Z_s)$ on the projection surface 351 and the coordinate $m_c'=(x_c', y_c')$ of the pixel of the virtual viewed image is expressed by the following formula.

$$\tilde{m}_C = P_P \cdot \tilde{M} \qquad \text{Formula (9)}$$

In Formula (28), $P_P$ is the perspective projection matrix when the projector 120 projects the image onto the projection surface 351. That is, the setter 210 executes a perspective projection transformation based on the perspective projection matrix when the projector 120 projects the image onto the projection surface 351 in the processing to calculate the coordinates of the pixels of the virtual viewed image corresponding to the three-dimensional coordinates of the points on the projection surface 351.

The correspondence between the coordinate $m_c'=(x_c', y_c')$ of the pixel of the virtual input image and the coordinate $m_p'=(x_p', y_p')$ of the pixel of the virtual viewed image is determined using Formula (27) and Formula (28). The setter 210 can calculate virtual correction information (a virtual projection parameter) $P_C'$ so that the information of the virtual input image is included within the area of the screen 355 of the virtual viewed image by repeating the processing of steps S221 to S229 described above in regard to FIG. 10. The setter 210 transmits, to the corrector 220, the information relating to the size of the image and the information relating to the position of the image determined as the virtual correction information $P_C'$.

Based on the virtual correction information $P_C'$ set by the setter 210, the corrector 220 generates the virtual viewed image virtually viewed at the projection position when the input image is virtually projected onto the projection surface 351 from the viewpoint position. The setter 210 updates the virtual correction information $P_C'$ using the comparison between the coordinates of the virtual input image and the coordinates of the virtual viewed image. On the other hand, based on the virtual correction information $P_C'$ set by the setter 210, the corrector 220 generates, as the corrected image 222, the virtual viewed image from the coordinates of the virtual viewed image that are calculated. Specifically, the corrector 220 can generate the corrected image 222 by performing projective texture mapping. The corrector 220 transmits the corrected image 222 that is generated to the projector 120. The projector 120 projects the corrected image 222.

Thus, according to the embodiment, the corrector 220 generates, as the corrected image 222, the virtual viewed image viewed when the projection position is used as the virtual viewpoint and the input image is virtually projected onto the projection surface 351 using the viewpoint position as the virtual projection position. By the projector 120 projecting the corrected image 222 onto the projection surface 351 from the projection position, even when the image is viewed from the viewpoint position in the case where the projection surface 351 has a non-planar configuration, an image that includes the information of the input image can be viewed while suppressing the geometrical distortion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image processor, comprising:
    a setter and a corrector implemented using hardware circuitry,
    the setter being configured to set correction information to cause an entirety of an object image to be viewable when an image projected onto a projection surface is viewed from a viewpoint, the object image being projected from a projection position, the correction information being generated based on first information relating to a configuration of the projection surface where the object image is projected, second information relating to the projection position, and third information relating to a position of the viewpoint, the setter being configured to receive the first information and the second information acquired by a calculator based on distance information, the distance information being obtained by a distance sensor by measuring a distance between the projection surface and the distance sensor, the setter being configured to receive the third information acquired by a viewpoint acquisition unit; and
    the corrector being configured to correct the object image based on the correction information,
    wherein the setter is configured to set the viewpoint to be a virtual projection position from which a virtual object image is projected, set the virtual projection position to be a virtual viewpoint, and set the correction information to cause an entirety of the virtual object image projected from the virtual projection position to be viewable when a virtual projected image is projected onto the projection surface and viewed from the virtual viewpoint.

2. An image projector, comprising:
    an image processor including a setter and a corrector implemented using hardware circuitry,
        the setter being configured to generate correction information to cause an entirety of an object image to be viewable when an image projected onto a projection surface is viewed from a viewpoint, the object image being projected from a projection position, the setting being based on first information relating to a configuration of the projection surface where the object image is projected, second information relating to the projection position, and third information relating to a position of the viewpoint, and
        the corrector being configured to correct the object image based on the correction information;
    a projector configured to project the corrected object image toward the projection surface; and
    an acquisition unit including
        a distance sensor configured to measure a distance between the projection surface and the distance sensor and to generate distance information,
        a calculator configured to acquire the first information and the second information based on the distance information and to transmit the first information and the second information to the setter, and a viewpoint acquisition unit configured to acquire the third information and transmit the third information to the setter, wherein the setter is configured to set the viewpoint to be a virtual projection position from which a virtual object image is projected, set the projection position to be a virtual viewpoint, and set the correction information to cause an entirety of the virtual object image projected from the virtual projection position to be viewable when a virtual projected image is projected onto the projection surface and viewed from the virtual viewpoint.

3. The projector according to claim 2, wherein the setter is configured to generate the correction information to maximize a size of the object image when the image projected onto the projection surface is viewed from the viewpoint.

4. The projector according to claim 2, wherein the setter is configured to perform clustering based on distances between the projection position and a plurality of points on the projection surface, and generate the correction information to cause the object image to be projected onto a region of cluster having the highest number of points.

5. The projector according to claim 4, wherein the setter is configured to perform the clustering based on the points of the distances nearest each other.

6. The projector according to claim 5, wherein the setter is configured to select the cluster having the highest number of points, and generate the correction information to cause a centroid of the selected cluster to correspond to a center of the projection of the object image.

7. The projector according to claim 2, wherein the setter is configured to perform clustering based on vectors normal to the projection surface at a plurality of points on the projection surface, and based on distances between the projection position and the plurality of points, and the setter is configured to generate the correction information to cause the object image to be projected onto a region of the cluster having the highest number of points.

8. The projector according to claim 7, wherein the setter is configured to perform the clustering based on the points of the normal vectors nearest each other and the points of the distances nearest each other.

9. The projector according to claim 8, wherein the setter is configured to select the cluster having the highest number of points, and generate the correction information to cause a centroid of the selected cluster to correspond to a center of the projection of the object image.

10. The projector according to claim 2, wherein the corrector is configured to set a virtual viewed image viewed from the virtual viewpoint to be a corrected image when the virtual object image corrected based on the correction information is projected onto the projection surface from the virtual projection position.

11. The projector according to claim 2, wherein the setter is configured to generate the correction information based on a two-dimensional coordinate of a pixel of the object image corresponding to a three-dimensional coordinate of a point on the projection surface and based on a two-dimensional coordinate of a pixel corresponding to the three-dimensional coordinate in the case where the image projected onto the projection surface is viewed from the viewpoint.

12. The projector according to claim 11, wherein the setter is configured to calculate the two-dimensional coordinate of the pixel of the viewed image corresponding to a pixel of an edge of the image projected onto the projection surface.

13. The projector according to claim 11, wherein the three-dimensional coordinate is calculated based on a coordinate of a pixel of an image of a pattern of light projected onto the projection surface and based on a coordinate of a pixel of an image of a pattern of light reflected from the projection surface.

14. The projector according to claim 2, wherein the information relating to the viewpoint is acquired from a lookup table, predetermined positions of the viewpoint being recorded in the lookup table.

15. The projector according to claim 2, wherein the information relating to the viewpoint is acquired based on a viewing angle and based on a distance between the projection position and the projection surface.

16. An image processing method, comprising:

generating correction information to cause an entirety of an object image to be viewable when an image projected onto a projection surface is viewed from a viewpoint, the object image being projected from a projection position, the correction information being generated based on first information relating to a configuration of the projection surface where the object image is projected, second information relating to the projection position, and third information relating to a position of the viewpoint, the first information and the second information being acquired based on distance information, the distance information being obtained based on a distance between the projection surface and a distance sensor, the third information being acquired by a viewpoint acquisition unit; and correcting the object image based on the correction information, wherein the viewpoint is set to be a virtual projection position from which a virtual object image is projected, the projection position is set to be a virtual viewpoint, the correction information is set to cause an entirety of the virtual object image projected from the virtual projection position to be viewable when a virtual projected image is projected onto the projection surface and viewed from the virtual viewpoint.

17. The method according to claim 16, wherein the correction information includes information relating to a size of the image projected onto the projection surface, and information relating to a position of the image projected onto the projection surface.

18. The projector according to claim 2, wherein the correction information includes information relating to a size of the image projected onto the projection surface, and information relating to a position of the image projected onto the projection surface.

* * * * *